United States Patent

Hughes et al.

[15] 3,646,759
[45] Mar. 7, 1972

[54] SECONDARY PISTON STOP-WIRE RETAINER RING

[72] Inventors: Harold W. Hughes; Paul B. Shutt, both of St. Joseph, Mich.

[73] Assignee: The Bendix Corporation

[22] Filed: Aug. 7, 1970

[21] Appl. No.: 61,884

[52] U.S. Cl. ..........................60/54.6 R, 60/54.6 E, 251/284
[51] Int. Cl. ........................................F15b 7/00, F16k 51/00
[58] Field of Search ...................60/54.5 E, 54.6; 92/15, 26, 92/85; 251/284

[56] References Cited

UNITED STATES PATENTS

| | | | |
|---|---|---|---|
| 3,165,896 | 1/1965 | Baldwin | 60/54.6 E |
| 3,250,074 | 5/1966 | Blondiau | 60/54.6 |
| 3,040,536 | 6/1962 | Werner | 60/54.6 |
| 1,377,407 | 5/1921 | Depew | 251/284 |
| 2,163,874 | 6/1939 | Goepfrich | 60/54.6 |

Primary Examiner—Edgar W. Geoghegan
Assistant Examiner—A. M. Zupcic
Attorney—Ken C. Decker and Plante, Hartz, Smith and Thompson

[57] ABSTRACT

A novel stop for the secondary piston of a split master cylinder is disclosed. The stop includes a radially expandable, circumferentially extending portion received in a circumferentially extending groove provided in the secondary fill port of the master cylinder and another portion extending coaxially with the axis of the port that projects into the master cylinder bore. Movement of the secondary piston past the portion of the piston stop that projects into said bore is thereby prevented.

4 Claims, 2 Drawing Figures

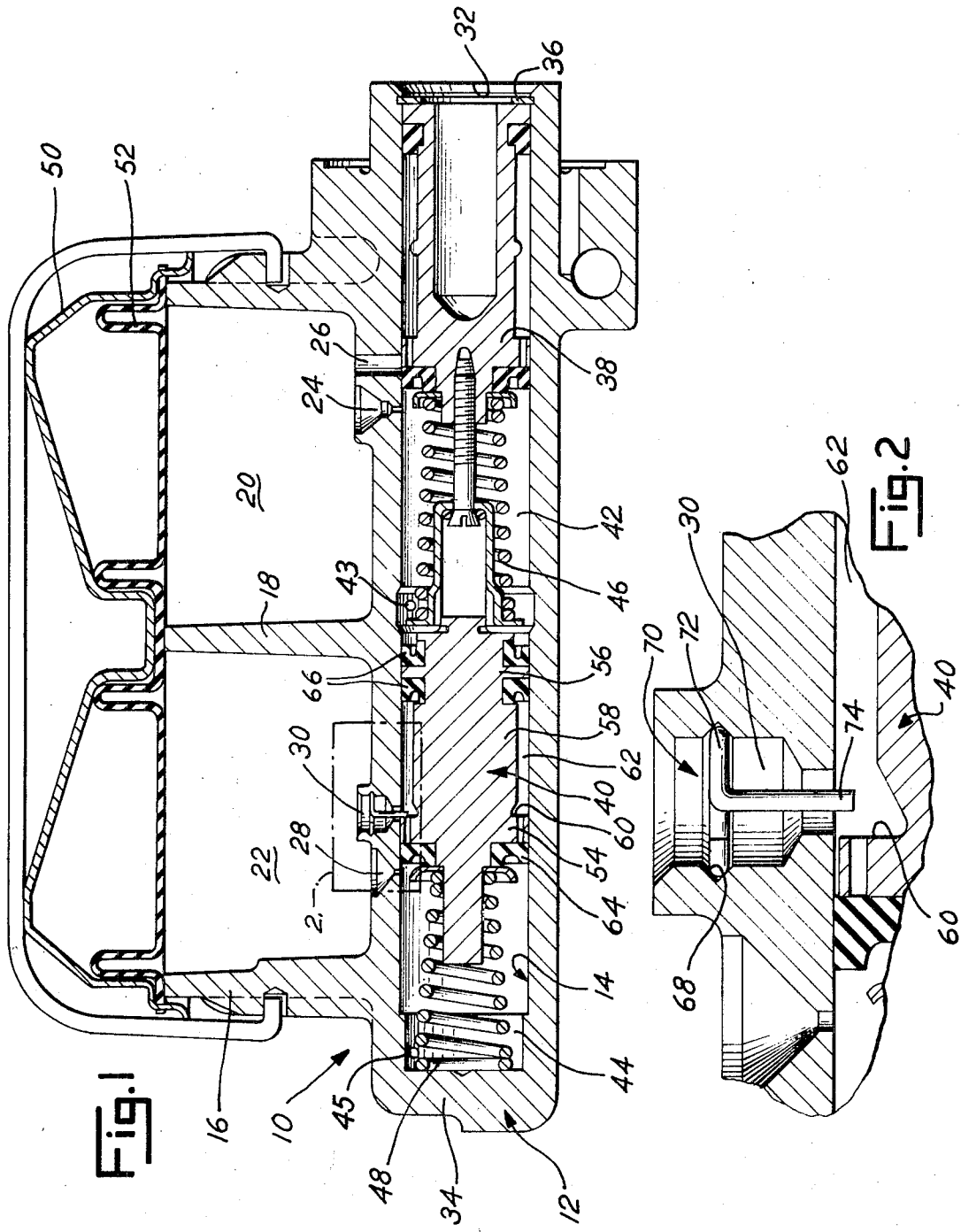

SECONDARY PISTON STOP-WIRE RETAINER RING

BACKGROUND OF THE INVENTION

This invention relates to a piston stop for use in an automotive split system master cylinder.

For safety, it has become customary to provide a piston stop to limit return movement of the secondary piston in a split master cylinder toward the open end of the bore. One common design provides a bolt which projects through the lower portion of the bore. This design requires that the bore of the master cylinder be made substantially longer than would otherwise be necessary. Another common design provides a stop that extends from the master cylinder reservoir through the top of the bore. This design requires that an extra opening be provided to provide a sufficient fluid flow area between the reservoir and the bore.

SUMMARY OF THE INVENTION

Therefore, an important object of my invention is to reduce the length of a master cylinder.

Another important object of my invention is to provide a single passageway between the reservoir and the bore of the master cylinder in lieu of the two openings presently required in many existing designs.

A further object of my invention is to reduce the time required to machine and assemble master cylinders.

A still further object of my invention is to facilitate disassembly of the master cylinder.

BRIEF DESCRIPTION OF THE DRAWINGS

FIG. 1 is a longitudinal cross-sectional view of a master cylinder made pursuant to the teachings of my present invention; and FIG. 2 is an enlarged cross-sectional, detailed view of that portion of FIG. 1 enclosed by the dashed lines.

DETAILED DESCRIPTION

Referring now to the drawings, a master cylinder 10 includes a housing 12 defining a bore 14 therewithin and further including an annular wall 16 defining a reservoir therein. A partition 18 divides the reservoir into a pair of compartments 20 and 22. A primary compensating port 24 and a primary fill port 26 communicate the compartment 20 with the right end portion (viewing FIG. 1) of the bore 14. Similarly, a secondary compensating port 28 and a secondary fill port 30 communicate the other compartment 22 with the other end of the bore 14.

The bore 14 includes an open end 32 and a closed end 34. An annular ring 36 circumscribes the bore 14 adjacent the open end 34. A primary piston 38 is slidably disposed in the bore 14 and one end of piston 38 is normally urged into engagement with the ring 36. A secondary piston 40 is slidably disposed within the bore 14 between the other end of the piston 38 and the closed end of the bore. A first fluid chamber 42 is defined between the two pistons 38 and 40, and a second fluid chamber 44 is defined by the end of the piston 40 and the closed end 34 of the bore 14. Chamber 42 is communicated to the rear brakes of the vehicle through outlet port 43 and chamber 44 is communicated to the front brakes of the vehicle through outlet port 45. A caged spring assembly 46 is disposed between the pistons 38 and 40, and another spring 48, which has a lower spring constant than does the caged spring assembly 46, is disposed between the end of piston 46 and the closed end 34 of the bore 14. A cap 50 and bladder 52 seal the open upper ends of the compartments 20 and 22.

The piston 40 is provided with larger diameter sections 54, 56 and a smaller diameter section 58 therebetween that cooperates with the section 54 to define a transversely extending shoulder 60 therebetween. The smaller diameter section 58 cooperates with the wall of the bore 14 to define an annular cavity 62 therebetween. Appropriate seals 64, 66 seal the piston against the wall of the bore 14. The primary piston 38 is of similar construction.

Referring now to FIG. 2, the secondary fill port or fluid passage 30 is provided with a circumferentially extending groove 68. A piston stop 70 is formed from a length of wire and includes a circumferentially extending portion 72 and a transversely extending portion 74. The circumferentially extending portion is radially resilient so that it can be compressed for insertion into the port 30, and then can expand radially to forcibly engage the sides of the groove. The transversely extending portion 74 extends generally coaxially with the fluid passage 30, and has a diameter substantially smaller than that of the passage 30 so that fluid communication between the compartment 22 and the bore 14 is not substantially impeded.

MODE OF OPERATION

When the vehicle brakes are released, the pistons 38 and 40 are disposed within the bore 14 in the position illustrated in FIG. 1. When the vehicle operator depresses the brake pedal mounted in the operator's compartment, the piston 38 and 40 move to the left viewing FIG. 1 thereby pressurizing the fluid in the chambers 42 and 44 to apply the vehicle brakes in a manner well known to those skilled in the art. It should be noted that when the pistons 38 and 40 are disposed in the brake-released position, the shoulder 60 does not engage the transversely extending portion 74 of the piston stop 70 that projects into the bore 14. However, under certain conditions of operation, such as when the vehicle brakes are applied and released a number of times in succession, the respective pressure levels in the chambers 42 and 44 are such that a force is exerted on the piston 40 urging it toward the open end of the bore 14. If no piston stop is provided, the seal 64 will be damaged when it moves past the fill port 30. However, in the device illustrated in the Figures, the transversely extending portion 74 on the piston stop 70 engages the shoulder 60 to limit movement of the piston 40 toward the right viewing the figures. Also, when the brakes are applied and released a number of times in succession, a void is created in the chamber 44 because the brake fluid does not return from the brake lines quickly enough. Therefore, fluid is pulled into the chamber 44 from the annular cavity 62 past the seal 64. This fluid must be quickly replenished from the fluid stored in the compartment 22. Since the diameter of the transversely extending portion 74 of the piston stop 70 is substantially smaller than the cross-sectional area of the fill port 30, flow of fluid between the compartment 22 and the cavity 62 is not substantially impeded.

What is claimed is:

1. In a fluid motor:
   a housing defining a bore therewith;
   a piston slidable in said bore;
   said piston being stepped to present a larger diameter portion slidably engaging the wall of said bore and a smaller diameter portion, said larger and smaller diameter portions defining a shoulder therebetween;
   said housing having an annular wall defining a reservoir therewithin;
   a passage communicating the reservoir with the bore; and
   a piston stop having a circumferentially extending annular portion engaging the wall of said passage and another portion extending through said passage into said bore for engagement by said shoulder, said another portion being spaced from the wall of said passage and having cross-sectional area substantially smaller than the cross-sectional area of the passage to permit substantially uninhibited flow through said passage.

2. The invention of claim 1; and
   a circumferentially extending groove in the wall of said passage;
   said groove receiving said circumferentially extending annular portion to thereby retain said piston stop within said passage.

3. The invention of claim 2:

said annular portion being expandable in a radial direction whereby the latter forcibly engages the walls of said groove.

4. The invention of claim 1:

said annular portion being expandable in a radial direction whereby the latter forcibly engages the wall of the passage.

* * * * *